United States Patent [19]
Takahashi et al.

[11] Patent Number: 4,999,999
[45] Date of Patent: * Mar. 19, 1991

[54] EXHAUST GAS CONTROL DEVICE FOR MOTORCYCLES

[75] Inventors: Naohisa Takahashi; Yoshitsugu Hiraguchi, both of Iwata, Japan

[73] Assignee: Yamaha Hatsudoki Kabuashiki Kaisha, Shingai, Japan

[*] Notice: The portion of the term of this patent subsequent to May 23, 2006 has been disclaimed.

[21] Appl. No.: 243,897

[22] Filed: Sep. 13, 1988

[30] Foreign Application Priority Data

Sep. 14, 1987 [JP] Japan .................................. 62-228597
Sep. 14, 1987 [JP] Japan .................................. 62-228598
Sep. 14, 1987 [JP] Japan .................................. 62-228599

[51] Int. Cl.⁵ ............................................. F02B 27/02
[52] U.S. Cl. ........................................ 60/313; 60/324
[58] Field of Search ................... 60/313, 312, 314, 324

[56] References Cited

U.S. PATENT DOCUMENTS

| | | |
|---|---|---|
| 933,906 | 9/1909 | Illy . |
| 1,411,226 | 3/1922 | Stumpf . |
| 2,230,740 | 2/1941 | Birkigt . |
| 2,239,262 | 4/1941 | Violet . |
| 2,305,946 | 12/1942 | Wilson et al. . |
| 2,627,851 | 2/1953 | Cushman . |
| 2,644,436 | 7/1953 | Berlyn . |
| 2,686,398 | 8/1954 | Anderson . |
| 2,717,583 | 9/1955 | Maybach et al. . |
| 3,523,418 | 8/1970 | Marsee . |
| 3,670,844 | 6/1972 | Penfold ................................. 60/313 |
| 3,751,921 | 8/1973 | Blomberg et al. . |
| 3,817,227 | 6/1974 | Onishi . |
| 3,938,330 | 2/1976 | Nakajima et al. . |
| 3,969,895 | 7/1976 | Krizman . |
| 4,051,821 | 10/1977 | Amann . |
| 4,254,752 | 3/1981 | Friddell et al. . |
| 4,522,029 | 6/1985 | Tomita et al. . |
| 4,539,813 | 9/1985 | Tomita et al. . |
| 4,545,200 | 10/1985 | Oike et al. . |
| 4,554,785 | 11/1985 | Oike . |
| 4,558,566 | 12/1985 | Shirakura . |
| 4,621,494 | 11/1986 | Fujita ................................. 60/323 |
| 4,656,830 | 4/1987 | Ohno ................................. 60/323 |

FOREIGN PATENT DOCUMENTS

| | | |
|---|---|---|
| 51-54118 | 11/1976 | Japan . |
| 32920 | 2/1985 | Japan ................................. 60/313 |
| 231156 | 9/1926 | United Kingdom . |
| 262044 | 2/1928 | United Kingdom . |
| 572724 | 6/1939 | United Kingdom . |
| 519806 | 4/1940 | United Kingdom . |
| 542429 | 1/1942 | United Kingdom . |
| 561932 | 1/1944 | United Kingdom . |

*Primary Examiner*—Douglas Hart
*Attorney, Agent, or Firm*—Ernest A. Beutler

[57] ABSTRACT

A number of embodiments of exhaust control devices particularly adapted for use with motorcycles and wherein the exhaust control device is designed to be positioned beneath the engine transmission assembly of the motorcycle and which offer a compact configuration. In each embodiment, the expansion device is formed of a fabricated member from sheet metal stampings. The exhaust device comprises an inlet or collector section an expansion chamber and an outlet. In some embodiments, both the inlet collector section conduits are formed from joined stampings and the expansion chamber is formed from joined stampings and in other embodiments only the expansion chamber is formed from joined stampings and the inlet conduits of the collector section are formed from formed tubular members. In all embodiments, an exhaust control valve is positioned in the expansion chamber for controlling the pulses existent in the inlet conduits of the collector section and the exhaust pipes so as to improve performance through out the entire engine load and speed ranges.

60 Claims, 9 Drawing Sheets

Figure 4
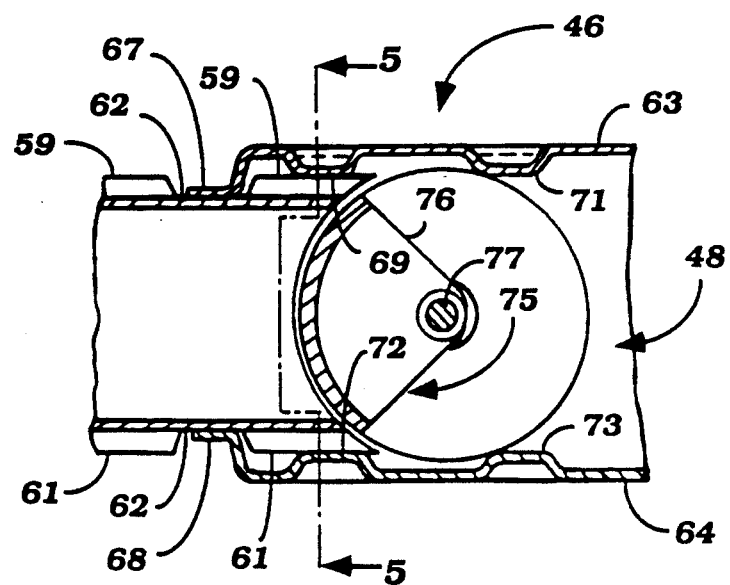
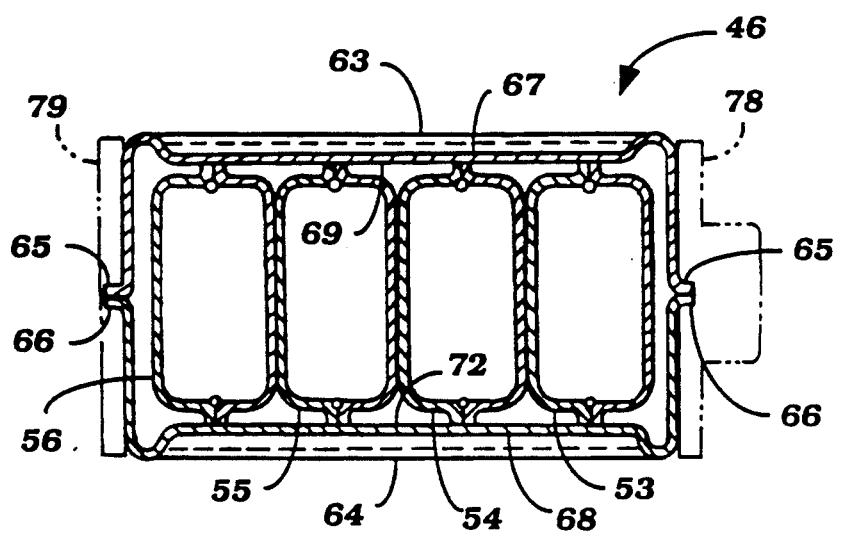
Figure 5

EXHAUST GAS CONTROL DEVICE FOR MOTORCYCLES

BACKGROUND OF THE INVENTION

This invention relates to an exhaust gas control device that is suitable for use in motorcycles.

It is well known that the performance of an internal combustion engine is effected significantly by the design and configuration of the exhaust system. Furthermore, it is also known that conventional exhaust systems which may be tuned to increase high speed performance, tend to reduce the performance under other running conditions. For example, it is known that the output of an internal combustion engine can be improved if the engine is provided with a plurality of exhaust pipes for each cylinder or exhaust port of the engine and which all merge into a common expansion chamber. The exhaust gases are then discharged to the atmosphere from this expansion chamber. Although this type of system can significantly increase high speed performance, it has also been found to deteriorate the performance at mid ranges. The resulting engine output provides an unsatisfactory dip in the mid range torque curve of the engine.

It has been recognized that the exhaust system can be made adjustable so as to increase its performance under all running conditions through the use of a reflective valve member that is positioned in the expansion chamber in confronting relationship with the exhaust pipes. By appropriately adjusting the effective flow areas of the exhaust pipes, the dip in mid range performance can be substantially eliminated. This is because the valve member causes the reflection of exhaust pulses back to the exhaust port which can improve rather than deteriorate scavenging and performance. Although this type of arrangement has particular utility, there are certain disadvantages and difficulties in applying it to actual practice.

The practical application of this principle is particularly difficult in connection with compact vehicles such as motorcycles. In conjunction with a motorcycle application, it is the normal practice to place the expansion chamber and exhaust control valve beneath the engine transmission assembly. The exhaust pipes then run from the cylinders of the engine down to the expansion chamber. However, it is desirable to insure that the expansion chamber has sufficient volume so as to improve the high speed performance of the engine and its low positioning in the motorcycle can adversely effect performance, such as the leaning of the motorcycle when cornering.

It is, therefore, desirable to provide a relatively compact transversely extending expansion chamber that can achieve the desired results. However, the configuration of such expansion chambers can give rise to problems in manufacturing. This is particularly true if it is attempted to form the expansion chamber and the associated exhaust gas control valves and the inlets to the expansion chamber from a single piece casting. Such castings are extremely complicated and because of this it is difficult to control the actual configuration of the device. It has, therefore, been proposed to provide an arrangement wherein the expansion chamber and valve assembly is at least partially fabricated. Such an arrangement is shown in Japanese published application No. 61-157999, dated July 7, 1986. In conjunction with forming such an expansion chamber and valve arrangement it is desirable to insure that the individual exhaust pipes are separated from each other and do not communicate with each other until they enter the expansion chamber and that this individual relationship extend up until the point at which the valve member is disposed. However, the construction shown in that Japanese application is extremely difficult to fabricate and many of the welds may become broken and cause the exhaust gases to communicate with each other upstream of the exhaust valve and render the device less effective.

It is, therefore, a principal object of this invention to provide an improved fabricated exhaust control device for a vehicle.

It is a further object of this invention to provide an improved fabricated exhaust control device which may be easily manufactured and which will be reliable in long term operation.

In connection with the use of such exhaust control devices, there is a further disadvantage to forming them as castings. Because of the large weight and mass of a casting, the applicability to lightweight vehicles is severely limited. Furthermore, the mass of the casting can give rise to a resonant effect which can provide objectionable noise.

It is, therefore, yet another object of this invention to provide an improved and simplified arrangement for fabricating an exhaust control device of the type described.

In connection with these types of exhaust control devices, it is desirable to provide, as aforenoted, a relatively low height and a relatively shallow width. If the exhaust pipes which enter the exhaust control device are round, as is typical practice, this tends to unduly extend the width of the unit. Therefore, it is proposed to employ an arrangement wherein the inlets for the exhaust control device are configured so that they start in a round shape to mate with the exhaust pipes and then merge into a rectangular shape so as to permit a more compact construction without increasing unduly the width or size of the device.

The use of such transitional pieces and the formation of a fabricated exhaust control device presents obvious problems.

It is, therefore, yet a further object of this invention to provide an improved fabricated exhaust control device wherein the inlet sections provide a transition from a cylindrical cross section to a rectangular cross section and a simple compact and easily fabricated arrangement is achieved.

SUMMARY OF THE INVENTION

This invention is adapted to be embodied in an exhaust control device for an internal combustion engine that is comprised of a plurality of exhaust pipes that extend from exhaust ports of the engine. The device is comprised of an expansion chamber, a plurality of inlet conduits each having an inlet end adapted to communicate with a respective one of the exhaust pipes and which have outlet ends disposed in side by side relationship within the expansion chamber. An exhaust control valve means is supported within the expansion chamber and cooperates with the inlet conduit outlet ends for controlling the effective area to control the transmission of exhaust pulses within the inlet conduits.

In accordance with a first embodiment of the invention, the exhaust device is fabricated from formed sheet metal members.

In accordance with another feature of the invention, the expansion chamber has an inlet portion that is defined by a generally rectangularly shaped opening that is defined by a flange and the inlet conduit outlet ends are generally rectangular in configuration and are contained and supported within this flanged opening.

BRIEF DESCRIPTION OF THE DRAWINGS

FIG. 4 is a cross sectional view taken along the line 4-4 of FIG. 3.

FIG. 5 is a cross sectional view taken along the line 5-5 of FIG. 4.

DETAILED DESCRIPTION OF THE PREFERRED EMBODIMENTS OF THE INVENTION

Figure 1:
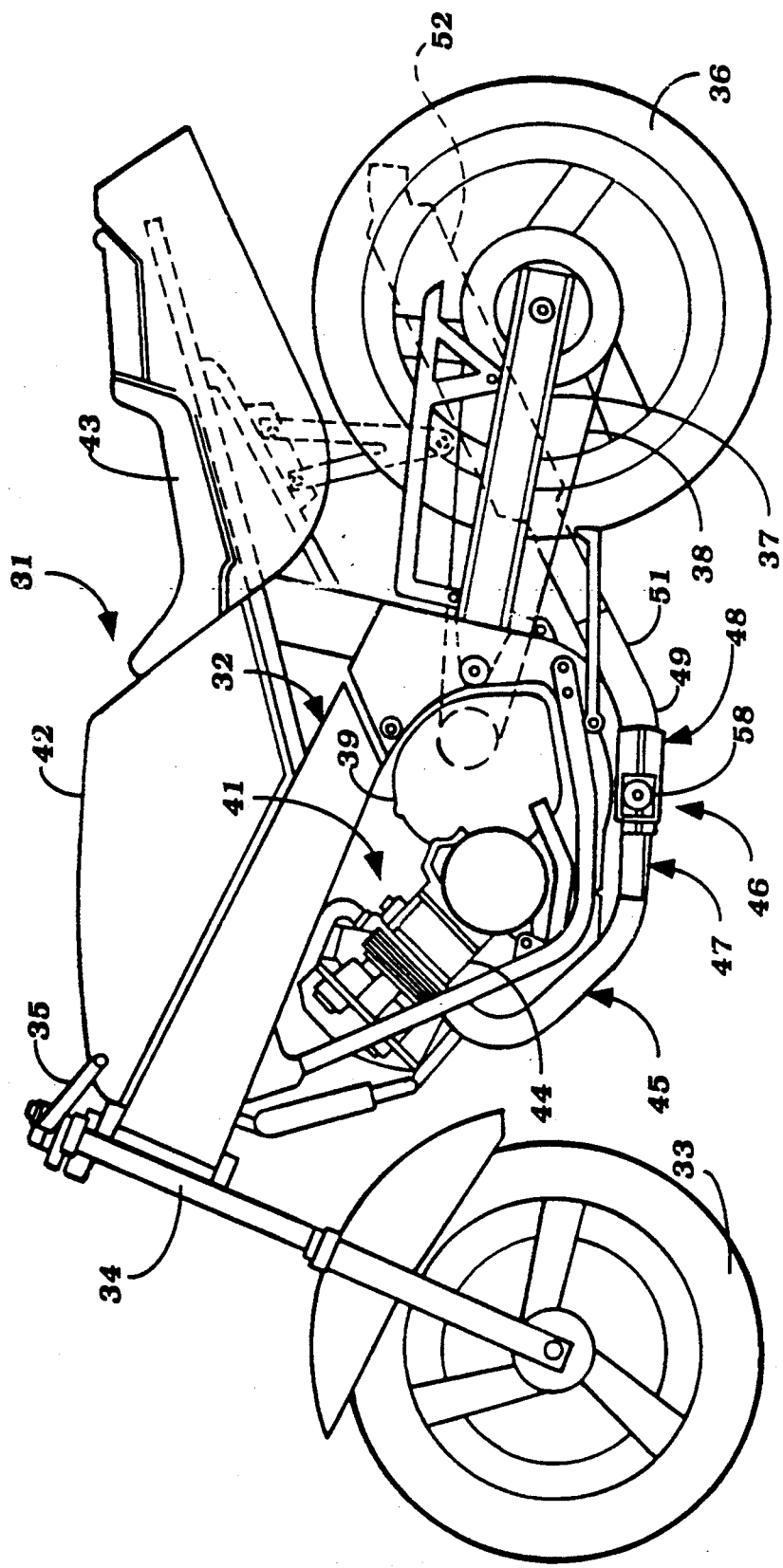
FIG. 1 is a side elevational view of a motorcycle constructed in accordance with an embodiment of the invention and illustrates the environment in which the invention may be employed.

Referring first to FIG. 1, a motorcycle constructed in accordance with an embodiment of the invention is identified generally by the reference numeral 31. As will become apparent, the invention deals with the exhaust system of the powering engine of the motorcycle and may have application in other uses than in connection with motorcycles. However, the invention has particular utility in conjunction with motorcycles because of the fact that they are extremely compact in nature, provide certain specific spatial problems which are solved by the construction of the embodiments of the invention and also require robust construction.

The motorcycle 31 is comprised of a frame assembly, indicated generally at 32 and which may be of any known type. A front wheel 33 is journaled by a front fork assembly 34 which is, in turn, journaled for steering movement by the frame assembly 32 in a known manner. A handlebar assembly 35 is supported at the upper end of the front fork 34 for steering the front wheel 33.

In addition, a rear wheel 36 is journaled at the rear of the frame assembly 32 by means of a trailing arm assembly 37. The rear wheel 36 is driven by means of a chain assembly 38 which is, in turn, driven from a combined crankcase, change speed transmission assembly 39 of an internal combustion engine 41. The engine 41 and its integral change speed transmission crankcase assembly 39 are supported in the frame 32 in a known manner.

A fuel tank 42 is supported by the frame 32 in overlying relation to the engine 41. The fuel 42 is positioned rearwardly of the handlebar assembly 35 and forwardly of a riders seat 43 that is carried by the frame 32.

The engine 41 is disposed in the frame 32 with its cylinder block 44 extending transversely relative to the longitudinal center line of the motorcycle 31. The cylinder block 44 is also canted forwardly so as to provide a lower center of gravity and has its exhaust ports facing forwardly and downwardly. An exhaust pipe assembly 45 extends from these exhaust ports first forwardly and then downwardly and rearwardly beneath the crankcase transmission assembly 39. In accordance with normal practice, there will be one exhaust pipe for each of the exhaust ports of the engine. In the illustrated embodiment, the engine is of the four cylinder in line type and there are four exhaust pipes 45. It is to be understood, however, that the invention can be used with engines having other cylindered numbers and other cylinder configurations. However, the invention has particular utility in multiple cylinder engines having multiple exhaust pipes in which the firing impulses occur at different times.

The exhaust pipes 45 terminate in an exhaust device indicated generally by the reference numeral 46 and which includes a collector or inlet section 47 of a construction as will be described, which communicates with an expansion chamber 48. The expansion chamber 48, in turn, has a discharge section 49 that communicates with a tail pipe 51. The tail pipe 51, in turn, delivers the exhaust gases to a muffler 52 that is disposed at one side of the rear wheel 36 and which discharges upwardly and rearwardly.

The construction of the exhaust device 48 will now be described in more detail by particular reference to FIGS. 2 through 6.

Generally, the exhaust device 46 is a fabricated assembly that is made up of a number of stampings that are formed from sheet metal such as stainless steel or the like. For instance, the collector or inlet section 47 is comprised of a number of inlet pipes 53, 54, 55 and 56 in a number which correspond to the number of exhaust pipes 45. Each of the inlet pipes or conduits 53 through 56 is formed from a pair of stampings 57 and 58 that have a configuration that starts in a circular shape at the inlet end which communicates with the respective exhaust pipe 45 and which terminates at a rectangular outlet end, as best seen in FIG. 5. The pieces 57 and 58 have respective mating flange pairs 59 and 61 which extend in a generally longitudinal direction and which have their mating faces lying in a vertically extending plane. It should be noted that the flange portions 59 and 61 are provided with reliefs 62 adjacent the outlet ends for a reason to be described.

In accordance with a feature of the invention, the sections 57 and 58 are affixed to each other by means of an internal weld bead 63 so that the weld bead will be disposed internally of the inlet conduits 53, 54, 55 and 56 and not externally. The reason for this is to ensure that the outer periphery of the conduits 53, 54 55 and 56 is generally smooth particularly where they mate with the expansion chamber 48, for a reason to be described.

The expansion chamber 48 is also of a fabricated construction and is formed from upper and lower stampings 63 and 64, which may be formed from a material such as stainless steel. The stamping 63 and 64 have generally U-shape with a pair of outwardly extending flanges 65 and 66 which lie in a generally horizontally extending plane. The flanges 65 and 66 are in abutting relationship and may be secured to each other as by welding.

It will be noted that the expansion chamber extends transversely a fairly substantial width but has a relatively shallow height so as to not interfere with leaning of the motorcycle 31 during cornering. In addition, the expansion chamber 48 extends somewhat diagonally beneath the crankcase assembly 39 so as to permit the inlet ends of the exhaust pipes to have substantially the same length and so as to accommodate the side mounted tail pipe 51 and muffler 52.

The flanges 65 and 66 extend through the side lengths of the expansion chamber 48 and also provide flange portions 67 and 68 at the forward portion of the expansion chamber 48 so as to form a generally rectangular shape inlet opening. The flange portion 67 and 68 extend into the flange recesses 62 of the inlet conduits so as to provide an interlocking relationship. If desired, welds may be formed in this area to secure the components together.

The upper and lower members 63 and 64 of the expansion chamber 48 are formed with respective recesses or embossments 69, 71, 72, and 73. The embossment 69 and 72 engage the upper and lower inlet conduit flanges 59 and 61 so as to provide further rigidity and locating characteristics.

Figure 2:
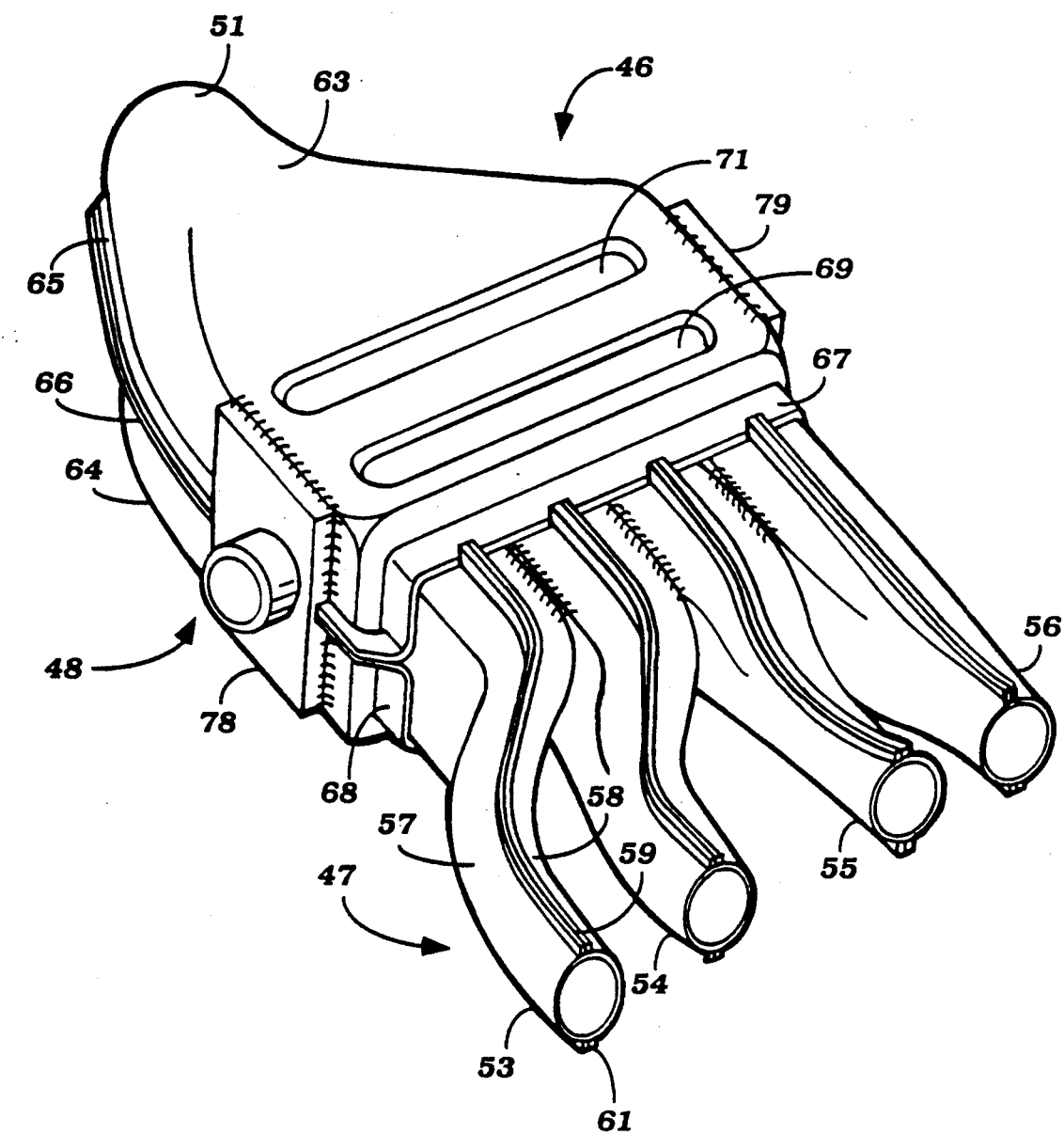
FIG. 2 is an enlarged top front perspective view of an exhaust control device constructed in accordance with a first embodiment of the invention.
Figure 3:
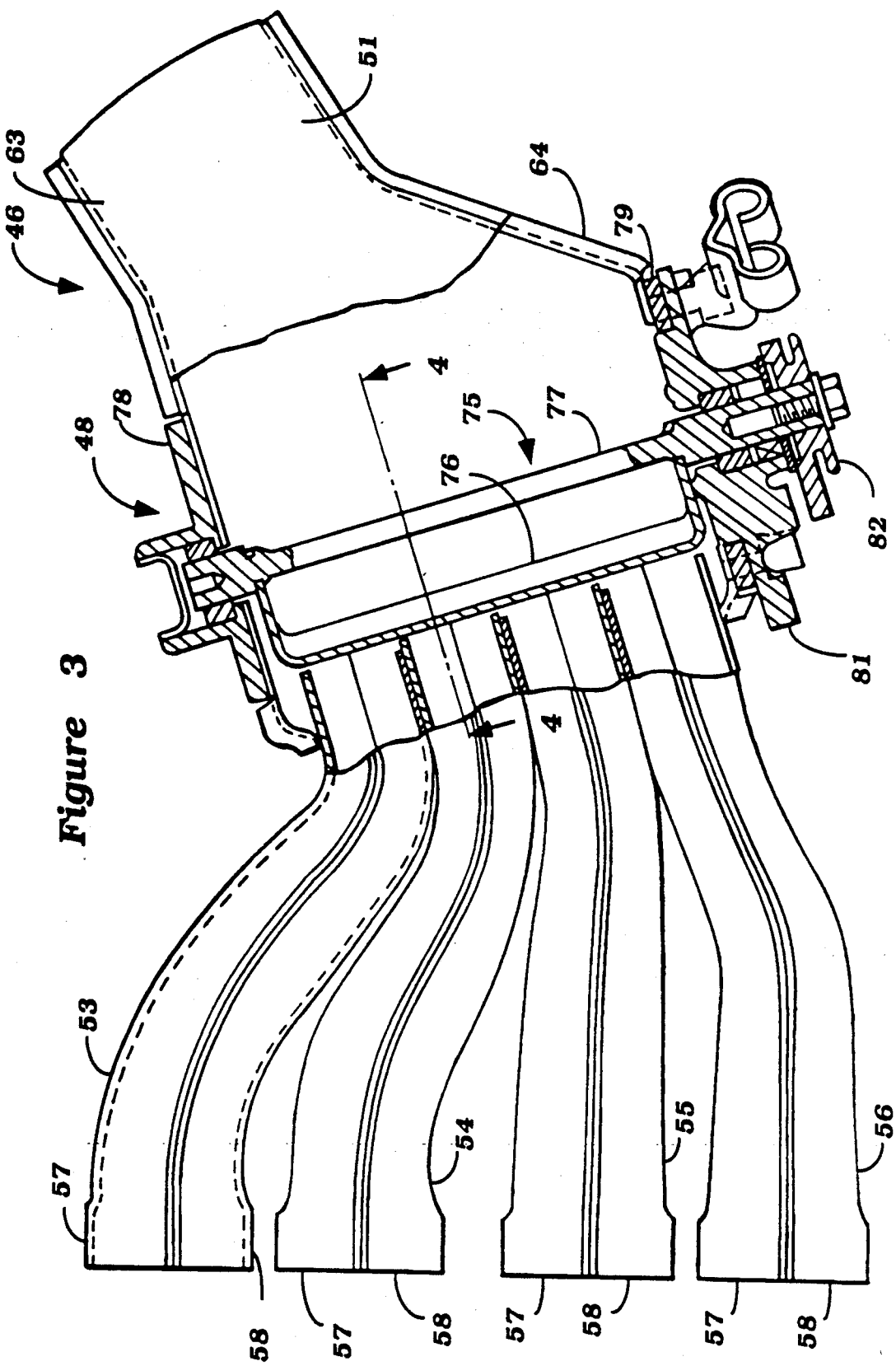
FIG. 3 is a further enlarged top elevational view of the exhaust control device, with a portion broken away.
Figure 6:
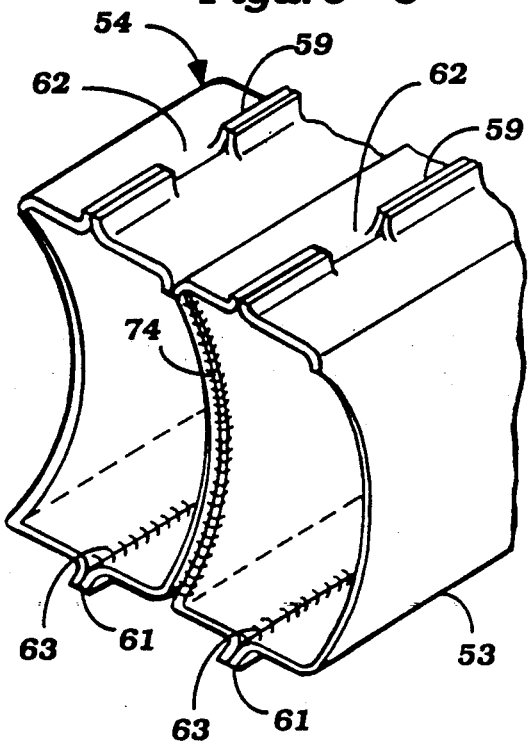
FIG. 6 is an enlarged perspective view showing the outlet ends of the inlet conduits and the one manner in which they may be formed.

It should be noted from FIGS. 3 and 6 that the inner ends of the inlet conduit sections 57 and 58 have slightly difference lengths so as to provide a staggered offset along which weld beads 74 may be laid so as to secure the inlet conduits 52, 53, 54, 55 and 56 to each other. In addition, weld beads as shown in FIG. 2 may be provided along the external surfaces where the inlet conduits 53, 54, 55 and 56 abut each other so as to provide a more rigid assembly.

The volume of the expansion chamber 48 and the length and shape of the exhaust pipes 45 and collector inlet conduits 53, 54, 55 and 56 are tuned so as to provide good maximum output performance. However, this tuning has been found to provide somewhat reduced midrange performance because the exhaust pulses of the individual cylinders tend to block each other due to the communication with the common expansion chamber. In order to avoid this problem and to improve midrange performance, an exhaust control valve indicated generally by the reference numeral 75 is supported within the expansion chamber 48 in proximity to the outlet ends of the inlet conduits 53, 54, 55 and 56. The exhaust control valve 75 includes an arcuate member 76 that is supported upon a valve shaft 77. The valve shaft 77 lies in a generally horizontally extending plane and tranverses the expansion chamber 48. One end of the valve shaft 77 is journaled in a reinforcing plate 78 that is affixed to one side of the expansion chamber 46. It should be noted that flanges 65 and 66 are interrupted in this area and the plate 78, in addition to supporting the shaft 77, provides reinforcing for the assembly.

In a similar manner, a second reinforcing plate 79 is affixed to the opposite side of the expansion chamber 48 and carries a bearing member 81 that journals this end of the valve shaft 77. A pulley 82 is affixed to the outer end of the shaft 77 and is operated by means of a servo mechanism, not shown, so as to control the angular position of the valve member 76 in response to various sensed engine running characteristics. Reference may be had to co-pending applications; 935,340, filed Nov. 26, 1986 and 935,342, filed Nov. 26, 1986 and assigned to the Assignee of this application for the theory of operation. Basically, the valve element 76 is positioned at intermediate speed ranges in such a way so as to cause negative pulses to be reflected back to the exhaust ports of the engine under midrange running so as to improve the efficiency of scavenging and the output of the engine. Also, the valve avoids blocking pulses between the engine cylinders so as to further improve performance.

In order to ensure good sealing and blocking of the individual outlet ends of the conduit 73, 74, 75 and 76 from each other, it should be noted that these ends are cut along a curved plane as best shown in FIGS. 4 and 6 so the arcuately curved valve member 76 can closely cooperate with them so as to achieve the desired result. It is also because of this curvature that it is desirable not to have the weld bead 74 exposed so that there will be good isolation between the output ends of the inlet conduits 53, 54, 55 and 56.

Figure 7:
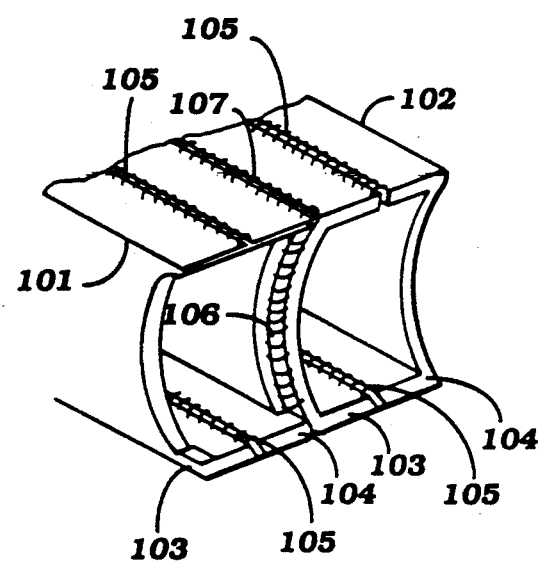
FIG. 7 is a perspective view, in part similar to FIG. 6, and shows another embodiment of the invention.

In the embodiment of the invention as thus far described, the inlet conduits 53, 54, 55 and 56 were formed as individual stampings that had mated flanges. It is to be understood, however, that the invention can be equally as well practiced with stampings having a U shape and without mated flanges. Such an arrangement is shown in FIG. 7 wherein a pair of conduits 101 and 102 are formed from facing U-shaped members 103 and 104, respectively. The abutting edges of the members 103 and 104 are joined by means of butt welds 105 so as to provide a smooth surface and devoid of external flanges. In this regard, a simpler configuration is employed but the interlocking relationship between the individual conduits and the expansion chamber afforded by the recesses in the flanges is not possible with this embodiment. In addition, there is a staggering of adjacent edges so that a weld bead 106 may assist in connecting the conduits 101 and 102 to each other. In addition, an external weld bead 107 may be employed for this purpose. In all other regards this embodiment is the same as the previously described embodiment and, for that reason, further description is not believed to be required.

Figure 8:
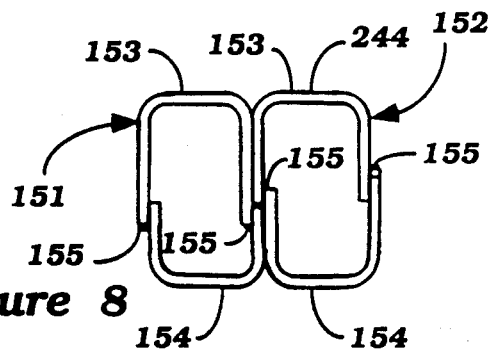
FIG. 8 is a cross sectional view through adjacent exhaust inlet conduits constructed in accordance with yet another embodiment of the invention.

FIG. 8 shows another embodiment of the invention and way in which the inlet conduits of the collector section may be fabricated. In this embodiment, a pair of inlet conduits is identified generally by the reference numeral 151 and 152. As with the previously described embodiments, it is to be understood that any number of inlet conduits may be employed in the collector section, depending upon the number of exhaust pipes to be joined. Each inlet conduit 151 and 152 is comprised of a pair of oppositely facing U-shaped sections 153 and 154. It should be noted that the sections 153 and 154 are connected not in abutting relationship with each other but rather in staggered relationship. As may be best seen in FIG. 8, this provides overlappings sections along which weld beads 155 may be formed so as to assist in connecting not only the sections 153 and 154 to each other but also so as to, at the same time, connect the inlet conduits 151 and 152 to each other. In all other regards, this embodiment is the same as the previously described embodiments and, for that reason, further discussion of the construction is not believed to be necessary.

Figure 9:
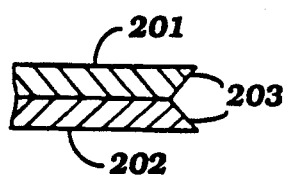
FIG. 9 is a cross sectional view showing the initial step of how adjacent portions of the exhaust conduits may be welded to each other.
Figure 10:
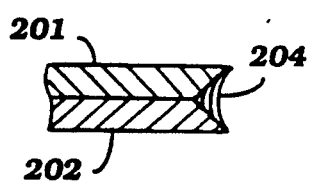
FIG. 10 is cross sectional view, in part similar to FIG. 9, showing the completion of the welding process.

In the embodiments of the invention as thus far described, adjacent side surfaces of the individual inlet conduits which face the valve element 76 have been staggered relative to each other so that the weld bead between these surfaces will not encroach in the valve area. Of course, other ways of forming the joint is possible wherein the weld bead will not interfere with the operation of the valve or its sealing characteristics. FIGS. 9 and 10 show one way in which such a weld may be formed. In this figure, the adjacent side surfaces 201 and 202 of the respective inlet conduit are provided with beveled edges 203 so as to define a V shaped recess (FIG. 9). A weld bead 204 may then be laid in this recess (FIG. 10) so as to join the members 201 and 202 together without having any protruding welding material.

Figure 11:
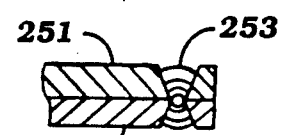
FIG. 11 is a cross sectional view, in part similar to FIG. 10, and shows another way in which the conduits may be welded together.

FIG. 11 shows another embodiment and way in which the individual inlet conduits of the collector section may be welded to each other without the weld bead protruding into the area adjacent the control valve. In this embodiment, the respective inlet conduits 251 and 252 have an interrupted section adjacent the end next to the control valve member. A circumferential butt weld 253 joins the interrupted conduits 251 and 252 to each other and also completes the individual inlet conduits.

Figure 12:
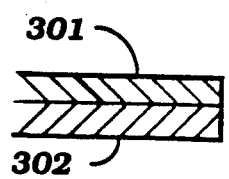
FIGS. 12, 13 and 14 are cross sectional views showing another embodiment of welding the inlet conduits together.
Figure 13:
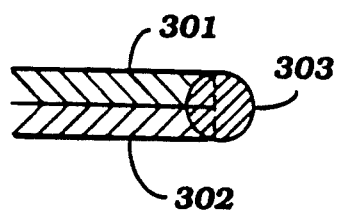
Figure 14:
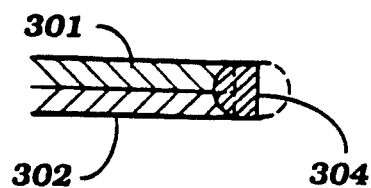

FIGS. 12 through 14 show yet another embodiment in which the ends of the conduits of the collector section may be connected to each other by welding without interfering the cooperating exhaust control member. In this embodiment, adjacent surfaces of the inlet conduits are identified generally by the reference numerals 301 and 302. As originally assembled, the ends of the conduits 301 and 302 are adjacent to each other (FIG. 12).

A weld bead 303 is then laid along the adjacent ends to join them together (FIG. 13). A portion of the weld as shown in broken lines is then removed as shown in FIG. 14 so as to provide a smooth edge 304 that can cooperate with the valve element.

Figure 15:
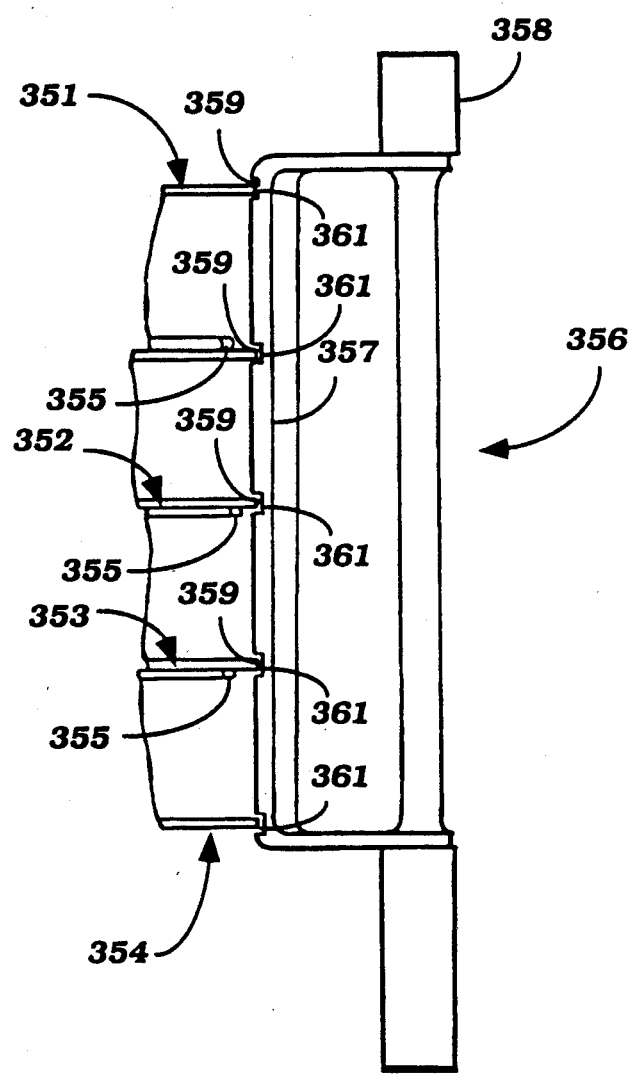
FIG. 15 is a partial top plane view, in part similar to FIG. 3, showing another embodiment of the invention.
Figure 16:
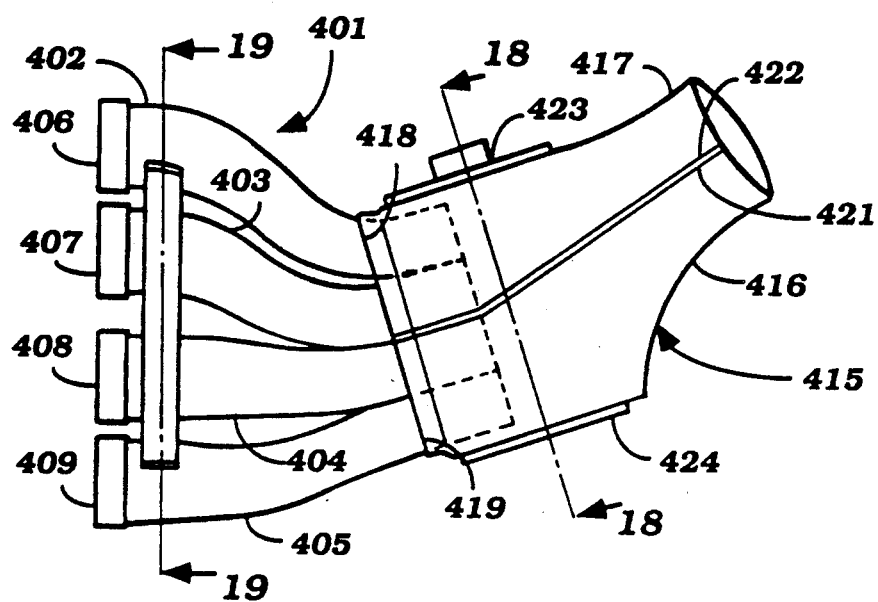
FIG. 16 is a top plane view of an exhaust control device constructed in accordance with yet another embodiment of the invention.
Figure 17:
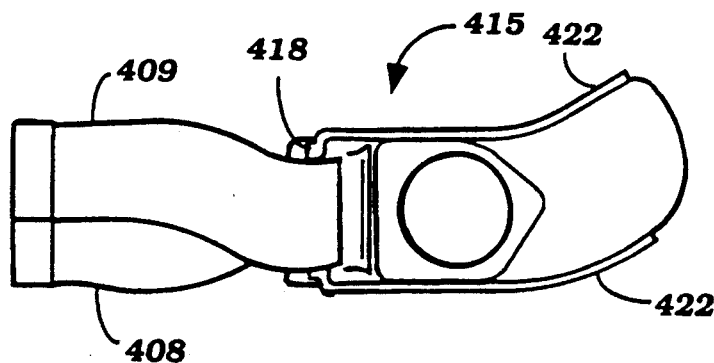
FIG. 17 is a side elevational view of the exhaust control device of this embodiment.
Figure 18:
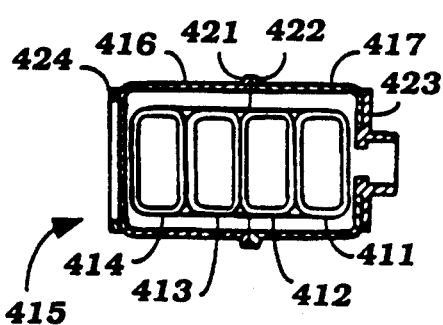
FIG. 18 is a cross sectional view taken along the line 18-18 of FIG. 16.
Figure 19:
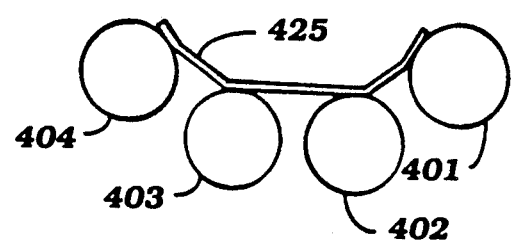
FIG. 19 is a view taken generally along the line 19-19 of FIG. 16.

FIG. 15 shows another embodiment of the invention wherein the sealing relationship between the ends of the respective inlet conduits of the collector section and the valve member are further improved. As seen in this embodiment, the individual collector sections are identified by the reference numerals 351, 352, 353 and 354. As with the previously described embodiments, the ends of the inlet conduits 351, 352, 353 and 354 are staggered so as to accommodate weld beads 355 for affixing the conduits 351, 352, 353 and 354 to each other.

In accordance with this embodiment of the invention, a valve member 356 which is comprised of a valve element 357 and supporting shaft 358 are incorporated for controlling the reflective outlet areas of the inlet conduits 351 through 354. To improve the prevention of flow between the conduits 351, 352, 353 and 354 when the valve element 357 is in its closed position, the valve element 357 is formed with reliefs 359 into which the extending portions 361 of the overlapping ends of the inlet conduits may extend.

In all of the embodiments thus far described the inlet conduits have been formed as fabricated sections made from two stampings. It is to be understood, however, that in some forms of the invention it may be desirable and possible to employ inlet conduits which are formed by suitably formed pieces of stainless steel tubing. FIGS. 16 through 19 and 20 show two such embodiments. In these embodiments, the expansion chamber is formed from a stamping, as with the previously described embodiments. However, in this embodiment, the expansion chamber halves are split along a vertical rather than a horizontally extending plane.

Referring first to the embodiment of FIGS. 16 through 19, the collector section indicated generally by the reference numeral 401 is comprised of a plurality of inlet conduits 402, 403, 404 and 405. As with the previously described embodiments, there are an equal number of inlet conduits for the number of exhaust pipes. The inlet conduits 402 through 405 are formed with flanged inlet sections 406, 407, 408 and 409 respectively so as to receive the discharge ends of the exhaust pipes (not shown) in a known manner. The flanges 406 through 409 are formed with a circular configuration. However, this circular configuration is gradually transformed into respective rectangular discharge openings 411, 412, 413 and 414 that extend into the expansion chamber, indicated generally by the reference numeral 415.

The expansion chamber 415 is formed by a pair of stainless steel stampings 416 and 417 that define the inlet opening by means of a pair of forwardly extending flanges 418 and 419 that embrace the rectangular outlet ends 411 through 414 of the inlet conduits 402, 403, 404 and 405. In addition, the stampings 416 and 417 have flanges 421 and 422 that part along a generally vertically extending plane and which are attached to each other, as by welding.

There is also provided a bearing plate 423 and valve control plate 424 at opposite sides of the expansion chamber for supporting the control valve member, which is not illustrated, but which may be considered to be the same as the construction of the embodiments of FIGS. 1 through 6. Because of this, further description is not required. If desired, a strap 425 may be also welded to the inlet ends of the inlet conduits 402 through 404 to further strengthen and rigidify the structure.

Figure 20:
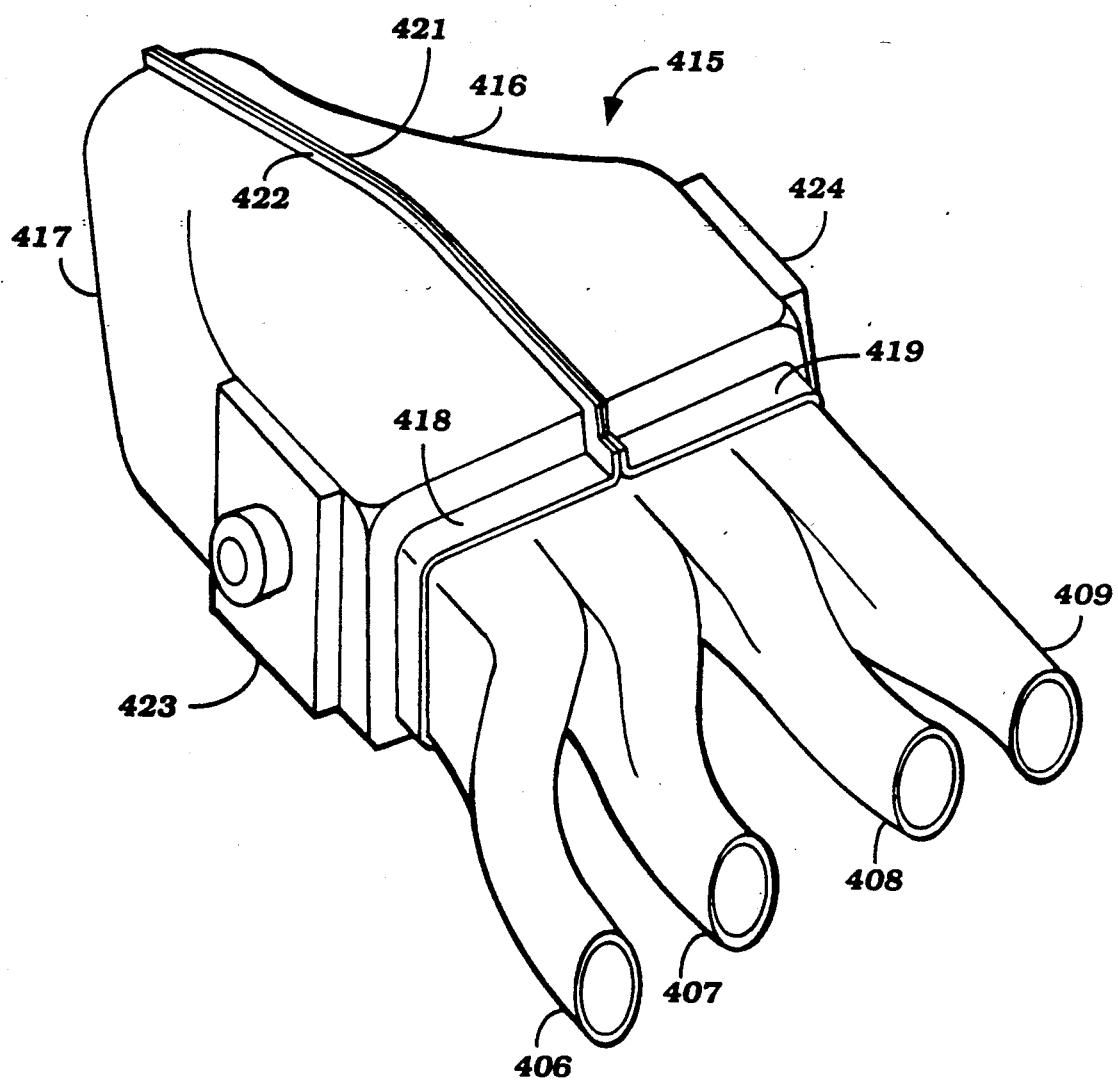
FIG. 20 is an enlarged perspective, in part similar to FIG. 2, and shows yet another embodiment of the invention.

FIG. 20 shows another embodiment of the invention which is substantially the same as the embodiment of FIGS. 16 through 19, however, the strap 425 is not employed. Because of the other similarity of these two embodiments, components which are otherwise the same have been identified by the same reference numerals and will not be described again.

From the foregoing description it should be readily apparent that a number of embodiments of the invention have been illustrated and described and each of which incorporates a fabricated exhaust device which is comprised of a collector section, an expansion chamber, a control valve and an exhaust gas outlet. In all embodiments, the components may be formed from sheet material and hence expensive and unsatisfactory castings are avoided and substantial weight reduction is possible. Also, various joining methods have been disclosed which permits the effective control of the exhaust gases and avoids the likelihood of exhaust flow from one exhaust inlet conduit to another when not desired. Although a number of embodiments of the invention have been illustrated and described various changes and modifications may be made without departing from the spirit and scope of the invention as defined by the appended claims.

We claim:

1. An exhaust control device for an internal combustion engine comprised of a plurality of exhaust pipes extending from exhaust ports of the engine, said device being comprised of an expansion chamber, a collector section comprised of a plurality of inlet conduits each adapted to communicate with an inlet end of a respective one of said exhaust pipes and having outlet ends disposed in side by side relationship with said expansion chamber, and an exhaust control means supported within said expansion chamber and cooperating with said conduit outlet ends for controlling the effective area thereof to control the transmission of exhaust pulses within said inlet conduits, the improvement comprising said exhaust device being fabricated of formed sheet members.

2. An exhaust control device for an internal combustion engine as set forth in claim 1 wherein the expansion chamber is formed from a pair of formed sheet members.

3. An exhaust control device for an internal combustion engine as set forth in claim 2 wherein the formed sheet members have mating flanges.

4. An exhaust control device for an internal combustion engine as set forth in claim 3 wherein the mating flanges define an inlet opening that receives the inlet conduit outlet ends.

5. An exhaust control device for an internal combustion engine as set forth in claim 4 wherein the flanges meet along a horizontally extending plane.

6. An exhaust control device for an internal combustion engine as set forth in claim 4 wherein the flanges meet along a generally vertically extending plane.

7. An exhaust control device for an internal combustion engine as set forth in claim 4 further including reinforcing plates affixed to opposite sides of the expansion chamber.

8. An exhaust control device for an internal combustion engine as set forth in claim 7 wherein the reinforcing plates journal a shaft of the control valve.

9. An exhaust control device for an internal combustion engine as set forth in claim 8 wherein the flanges meet along a horizontally extending plane.

10. An exhaust control device for an internal combustion engine as set forth in claim 8 wherein the flanges meet along a generally vertically extending plane.

11. An exhaust control device for an internal combustion engine as set forth in claim 4 wherein the inlet opening is rectangular and the outlet ends of the inlet conduit are rectangular.

12. An exhaust control device for an internal combustion engine as set forth in claim 11 wherein the inlet ends of the inlet conduits are round and the inlet conduits are configured to merge from a round cross sectional area to the rectangular cross sectional area.

13. An exhaust control device for an internal combustion engine as set forth in claim 12 wherein the outlet ends are affixed as by welding to the flanges of the expansion chamber.

14. An exhaust control device for an internal combustion engine as set forth in claim 13 wherein the flanges meet along a horizontally extending plane.

15. An exhaust control device for an internal combustion engine as set forth in claim 13 wherein the flanges meet along a generally vertically extending plane.

16. An exhaust control device for an internal combustion engine as set forth in claim 13 wherein each of the inlet conduits is formed from a pair of pieces having mating flanges.

17. An exhaust control device for an internal combustion engine as set forth in claim 16 wherein the flanges of the inlet conduits meet in vertically extending planes.

18. An exhaust control device for an internal combustion engine as set forth in claim 17 wherein the flanges of the inlet conduits are interrupted to provide a recess that receive the flanges of the expansion chamber.

19. An exhaust control device for an internal combustion engine as set forth in claim 16 wherein the inlet conduit pieces are affixed to each other by welding along the internal surface thereof.

20. An exhaust control device for an internal combustion engine as set forth in claim 16 wherein the inlet conduits have staggered surfaces at their outlet ends so as to provide an area to accommodate a weld bead spaced inwardly from the outlet ends.

21. An exhaust control device for an internal combustion engine as set forth in claim 20 wherein the outlet ends of the inlet conduits are arcuate and the valve member is arcuate to cooperate therewith.

22. An exhaust control device for an internal combustion engine as set forth in claim 16 wherein the outlet ends of the inlet conduits are arcuate and the exhaust control valve means has an arcuate configuration provided with reliefs to receive the ends of the inlet conduits.

23. An exhaust control device for an internal combustion engine as set forth in claim 1 in combination with a motorcycle having a combined engine transmission assembly, the exhaust pipes extending from the exhaust ports of the engine downwardly and passing beneath said engine transmission assembly, the said exhaust control device being positioned beneath said engine transmission assembly.

24. A motorcycle as set forth in claim 23 wherein the expansion chamber is formed from a pair of formed sheet members.

25. A motorcycle as set forth in claim 24 wherein the formed sheet members have mating flanges.

26. A motorcycle as set forth in claim 25 wherein the mating flanges define an inlet opening that receives the inlet conduit outlet ends.

27. A motorcycle as set forth in claim 26 wherein the flanges meet along a horizontally extending plane.

28. A motorcycle as set forth in claim 26 wherein the flanges meet along a generally vertically extending plane.

29. A motorcycle as set forth in claim 26 further including reinforcing plates affixed to opposite sides of the expansion chamber.

30. A motorcycle as set forth in claim 29 wherein the reinforcing plates journal a shaft of the control valve.

31. A motorcycle as set forth in claim 30 wherein the flanges meet along a horizontally extending plane.

32. A motorcycle as set forth in claim 30 wherein the flanges meet along a generally vertically extending plane.

33. A motorcycle as set forth in claim 23 wherein the inlet opening is rectangular and the outlet ends of the inlet conduit are rectangular.

34. A motorcycle as set forth in claim 33 wherein the inlet ends of the inlet conduits are round and the inlet conduits are configured to merge from a round cross sectional area to the rectangular cross sectional area.

35. A motorcycle as set forth in claim 34 wherein the outlet ends are affixed as by welding to the flanges of the expansion chamber.

36. A motorcycle as set forth in claim 35 wherein the flanges meet along a horizontally extending plane.

37. A motorcycle as set forth in claim 36 wherein the flanges meet along a generally vertically extending plane.

38. A motorcycle as set forth in claim 33 wherein each of the inlet conduits is formed from a pair of pieces having mating flanges.

39. A motorcycle as set forth in claim 38 wherein the flanges of the inlet conduits meet in vertically extending planes.

40. A motorcycle as set forth in claim 39 wherein the flanges of the inlet conduits are interrupted to provide a recess that receive the flanges of the expansion chamber.

41. A motorcycle as set forth in claim 36 wherein the inlet conduit pieces are affixed to each other by welding along the internal surface thereof.

42. A motorcycle as set forth in claim 36 wherein the inlet conduits have staggered surfaces at their outlet ends so as to provide an area to accommodate a weld bead spaced inwardly from the outlet ends.

43. A motorcycle as set forth in claim 42 wherein the outlet ends of the inlet conduits are arcuate and the valve member is arcuate to cooperate therewith.

44. A motorcycle as set forth in claim 43 wherein the outlet ends of the inlet conduits are arcuate and the exhaust control valve means has an arcuate configuration provided with reliefs to receive the ends of the inlet conduits.

45. An exhaust control device for an internal combustion engine comprises a plurality of exhaust pipes extending from exhaust ports of the engine, said device being comprised of an expansion chamber, a collector section comprised of a plurality of inlet conduits each adapted to communicate with an inlet end of a respective one of said exhaust pipes and having outlet ends disposed in side by side relationship with said expansion chamber, and an exhaust control means supported within said expansion chamber and cooperating with said conduit outlet ends for controlling the effective area thereof to control the transmission of exhaust pulses within said inlet conduits, the improvement comprising said expansion chamber being formed with a generally rectangular inlet opening, said inlet conduit outlet ends being rectangular and received in abutting side by side relation in said expansion chamber inlet opening and affixed thereto.

46. An exhaust control device for an internal combustion engine as set forth in claim 45 wherein the expansion chamber is formed from a pair of formed sheet members.

47. An exhaust control device for an internal combustion engine as set forth in claim 46 wherein the formed sheet members have mating flanges.

48. An exhaust control device for an internal combustion engine as set forth in claim 47 wherein the mating flanges define the inlet opening that receives the inlet conduit outlet ends.

49. An exhaust control device for an internal combustion engine as set forth in claim 48 wherein the flanges meet along a horizontally extending plane.

50. An exhaust control device for an internal combustion engine as set forth in claim 48 wherein the flanges meet along a generally vertically extending plane.

51. An exhaust control device for an internal combustion engine as set forth in claim 48 further including reinforcing plates affixed to opposite sides of the expansion chamber.

52. An exhaust control device for an internal combustion engine as set forth in claim 51 wherein the reinforcing plates journal a shaft of the control valve.

53. An exhaust control device for an internal combustion engine as set forth in claim 52 wherein the flanges meets along a horizontally extending plane.

54. An exhaust control device for an internal combustion engine as set forth in claim 52 wherein the flanges meet along a generally vertically extending plane.

55. An exhaust control device for an internal combustion engine as set forth in claim 45 wherein the inlet ends of the inlet conduits are round and the inlet conduits are configured to merge from a round cross sectional area to the rectangular cross section.

56. An exhaust control device for an internal combustion engine as set forth in claim 55 wherein the outlet ends are affixed as by welding to flanges formed around and defining the inlet of the expansion chamber.

57. An exhaust control device for an internal combustion engine as set forth in claim 56 wherein the expansion chambers inlet opening flanges meet along a horizontally extending plane.

58. An exhaust control device for an internal combustion engine as set forth in claim 56 wherein the expansion chamber inlet opening flanges meet along a generally vertically extending plane.

59. An exhaust control device for an internal combustion engine as set forth in claim 45 wherein each of the inlet conduits is formed from a pair of pieces having mating flanges.

60. An exhaust control device for an internal combustion engine as set forth in claim 59 wherein the flanges meet in vertically extending planes.

* * * * *